United States Patent
Kashiwagi

(10) Patent No.: US 11,858,487 B2
(45) Date of Patent: Jan. 2, 2024

(54) BRAKE CONTROL APPARATUS AND METHOD FOR DETECTING ABNORMALITY IN BRAKE CONTROL APPARATUS

(71) Applicant: Hitachi Automotive Systems, Ltd., Hitachinaka (JP)

(72) Inventor: Makoto Kashiwagi, Obihiro (JP)

(73) Assignee: Hitachi Astemo, Ltd., Hitachinaka (JP)

(*) Notice: Subject to any disclaimer, the term of this patent is extended or adjusted under 35 U.S.C. 154(b) by 637 days.

(21) Appl. No.: 17/055,210

(22) PCT Filed: Apr. 25, 2019

(86) PCT No.: PCT/JP2019/017566
§ 371 (c)(1),
(2) Date: Nov. 13, 2020

(87) PCT Pub. No.: WO2019/220910
PCT Pub. Date: Nov. 21, 2019

(65) Prior Publication Data
US 2021/0114577 A1    Apr. 22, 2021

(30) Foreign Application Priority Data
May 15, 2018 (JP) .................................. 2018-093626

(51) Int. Cl.
*B60T 17/22* (2006.01)
*B60Q 9/00* (2006.01)
(Continued)

(52) U.S. Cl.
CPC .............. *B60T 17/221* (2013.01); *B60Q 9/00* (2013.01); *B60T 13/142* (2013.01);
(Continued)

(58) Field of Classification Search
CPC .... B60T 17/221; B60T 13/142; B60T 13/686; B60T 2270/406; B60T 2270/88; B60Q 9/00
See application file for complete search history.

(56) References Cited

U.S. PATENT DOCUMENTS

| | | | |
|---|---|---|---|
| 5,951,118 A | 9/1999 | Soejima | |
| 6,123,397 A * | 9/2000 | Ohtomo | B60T 8/90 303/116.1 |

(Continued)

FOREIGN PATENT DOCUMENTS

| | | |
|---|---|---|
| JP | 11-59403 A | 3/1999 |
| JP | 2007-131247 A | 5/2007 |

(Continued)

OTHER PUBLICATIONS

International Search Report (PCT/ISA/210) issued in PCT Application No. PCT/JP2019/017566 dated Jul. 16, 2019 with English translation (four (4) pages).

(Continued)

*Primary Examiner* — Thomas W Irvin
(74) *Attorney, Agent, or Firm* — Crowell & Moring LLP

(57) ABSTRACT

An ECU determines an abnormality in a master cylinder pressure sensor or a discharge pressure sensor based on a detection value of the master cylinder pressure sensor and a detection value of the discharge pressure sensor after actuating a shut-off valve in a valve-opening direction and actuating a pump.

11 Claims, 7 Drawing Sheets

(51) Int. Cl.
    *B60T 13/14*     (2006.01)
    *B60T 13/68*     (2006.01)

(52) U.S. Cl.
    CPC ....... *B60T 13/686* (2013.01); *B60T 2270/406* (2013.01); *B60T 2270/88* (2013.01)

(56) References Cited

U.S. PATENT DOCUMENTS

| | | | |
|---|---|---|---|
| 8,007,056 B2* | 8/2011 | Ohkubo | B60T 17/22 303/191 |
| 8,029,072 B2* | 10/2011 | Miyazaki | B60T 8/4081 303/122.04 |
| 10,124,783 B2* | 11/2018 | Spieker | B60T 13/662 |
| 2007/0108837 A1* | 5/2007 | Ohkubo | B60T 8/90 303/122.08 |
| 2015/0274143 A1* | 10/2015 | Miyazaki | B60T 8/348 303/9.61 |
| 2017/0158184 A1* | 6/2017 | Choi | B60T 17/221 |
| 2018/0118183 A1* | 5/2018 | Spieker | B60T 7/042 |
| 2018/0162339 A1* | 6/2018 | Irwan | B60T 8/00 |
| 2018/0162340 A1* | 6/2018 | Irwan | B60T 8/90 |
| 2019/0184958 A1* | 6/2019 | Watanabe | B60T 8/48 |

FOREIGN PATENT DOCUMENTS

| | | | |
|---|---|---|---|
| JP | 2011-25803 A | 2/2011 | |
| JP | 2017-1478 A | 1/2017 | |

OTHER PUBLICATIONS

Japanese-language Written Opinion (PCT/ISA/237) issued in PCT Application No. PCT/JP2019/017566 dated Jul. 16, 2019 with English translation (10 pages).

\* cited by examiner

BRAKE CONTROL APPARATUS AND METHOD FOR DETECTING ABNORMALITY IN BRAKE CONTROL APPARATUS

TECHNICAL FIELD

The present invention relates to a brake control apparatus and a method for detecting an abnormality in a brake control apparatus.

BACKGROUND ART

PTL 1 discloses a brake control apparatus including a pump pressure sensor, a primary-system pressure sensor, and a secondary-system pressure sensor on the wheel cylinder side with respect to shut-off valves in a connection fluid passage connecting a master cylinder and wheel cylinders, i.e., on the downstream side of the shut-off valves.

CITATION LIST

Patent Literature

[PTL 1] Japanese Patent Application Public Disclosure No. 2017-1478

SUMMARY OF INVENTION

Technical Problem

In the above-described patent literature, PTL 1, an abnormality in the pressure sensor can be detected by comparing detection values of the three pressure sensors. However, for example, in a case where only one pressure sensor is provided on the downstream side of the shut-off valves, the detectability for an abnormality in the pressure sensor may reduce when a similar method is employed.

Solution to Problem

One of objects of the present invention is to provide a brake control apparatus and a method for detecting an abnormality in a brake control apparatus that can improve the detectability for an abnormality in a pressure sensor.

According to one aspect of the present invention, a brake control apparatus determines an abnormality in a first pressure sensor or a second pressure sensor based on a detection value of the first pressure sensor configured to detect a hydraulic pressure on an upstream side of a shut-off valve portion in a connection fluid passage and a detection value of the second pressure sensor configured to detect a hydraulic pressure on a downstream side of the shut-off valve portion in the connection fluid passage after actuating the shut-off valve portion in a valve-opening direction and actuating a hydraulic pressure source.

Therefore, according to the one aspect of the present invention, the detectability for an abnormality in the pressure sensor can be improved.

DESCRIPTION OF EMBODIMENTS

First Embodiment

Figure 1:
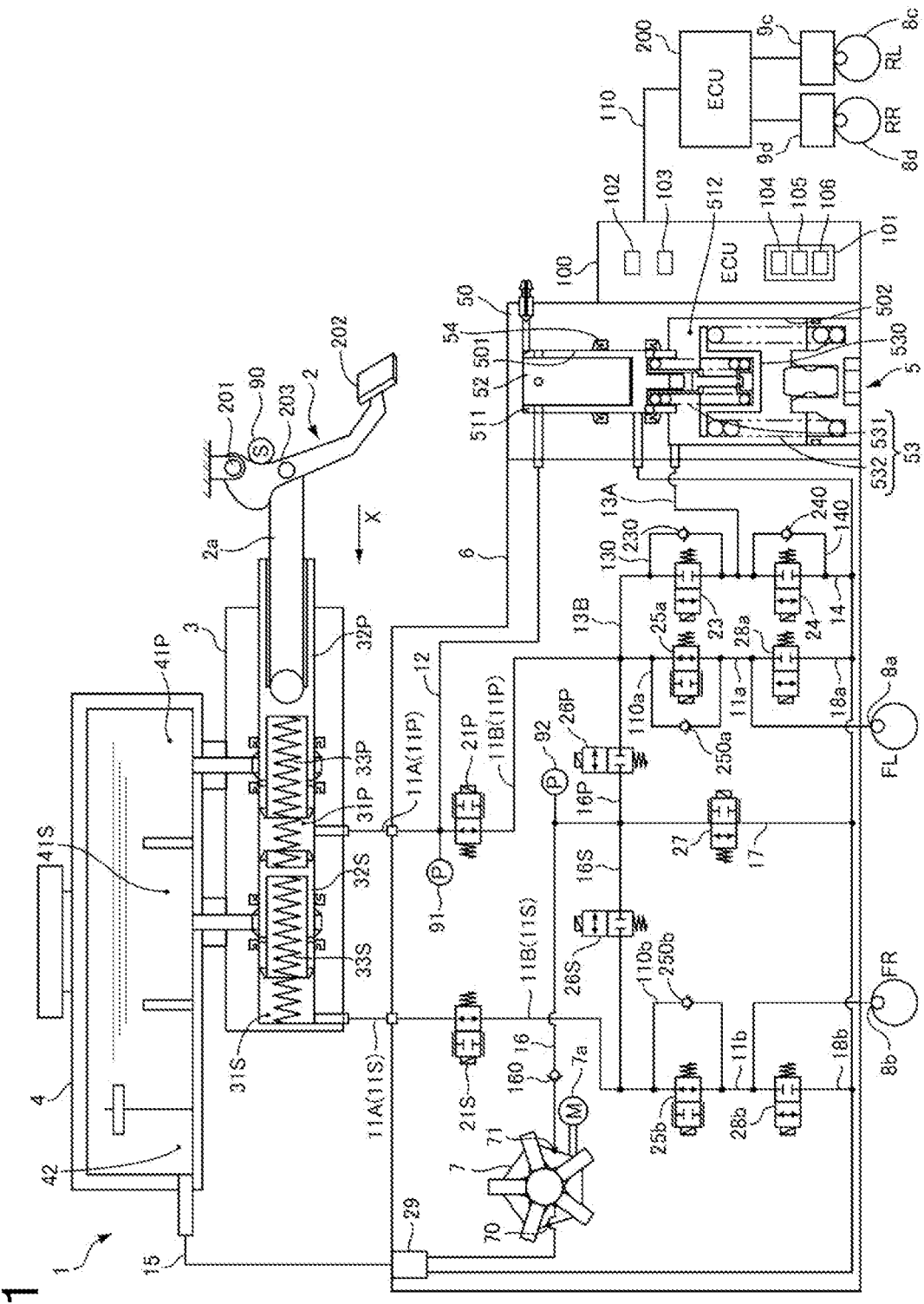
FIG. 1 illustrates the configuration of a brake control apparatus 1 according to a first embodiment.

FIG. 1 illustrates the configuration of a brake control apparatus 1 according to a first embodiment.

The brake control apparatus 1 includes a hydraulic brake and an electric brake especially preferably usable for an electric vehicle. The electric vehicle is, for example, a hybrid automobile including a motor generator besides an engine (an internal combustion engine) or an electric automobile including only a motor generator as a driving force source for driving wheels. The brake control apparatus 1 may also be applied to a vehicle using only an engine as the driving force source. Regarding each portion illustrated in FIG. 1, "P" placed at the end of the reference numeral indicates that this portion corresponds to a primary system (a P system) of a master cylinder 3. "S" placed at the end of the reference numeral indicates that this portion corresponds to a secondary system (an S system) of the master cylinder 3. When the P system and the S system are not distinguished from each other, the indexes P and S will be omitted. Further, "a" placed at the end of the reference numeral indicates that this portion corresponds to a front left wheel FL. Further, "b" placed at the end of the reference numeral indicates that this portion corresponds to a front right wheel FR. Further, "c" placed at the end of the reference numeral indicates that this portion corresponds to a rear left wheel RL. Further, "d" placed at the end of the reference numeral indicates that this portion corresponds to a rear right wheel RR. When the individual wheels FL to RR are not distinguished from one another, the indexes "a", "b", "c", and "d" will be omitted.

The brake control apparatus 1 applies a braking torque to each of the wheels FL to RL by pressing brake pads provided on a vehicle body side in correspondence with each of the wheels FL to RL of the vehicle against a brake disk provided on a wheel side. On the front wheel FL and FR side, the brake pads are moved by generating a brake hydraulic pressure (a wheel cylinder hydraulic pressure) in a wheel cylinder (a braking force application portion) 8 with use of the hydraulic brake. On the rear wheel RL and RR side, the brake pads are moved by generating a motor thrust force with use of the electric brake. A drum brake may be used in place of the disk brake.

A brake pedal 2 is a brake operation member that receives an input of a brake operation performed by a driver. The brake pedal 2 is a so-called suspended-type brake pedal, and the proximal end thereof is rotatably supported by a shaft 201. A pad 202, which serves as a target that the driver presses, is provided at a distal end of the brake pedal 2. One end of a push rod 2a is connected rotatably to the proximal side of the brake pedal 2 between the shaft 201 and the pad 202 via a shaft 203.

The master cylinder 3 generates a brake hydraulic pressure (a master cylinder hydraulic pressure) by being actuated by an operation performed on the brake pedal 2 by the driver (the brake operation). The brake control apparatus 1 does not include a negative-pressure booster that boosts or amplifies a brake operation force (a force pressing the brake pedal 2) by utilizing an intake negative pressure generated by the engine of the vehicle. This omission contributes to realizing the miniaturization of the brake control apparatus 1.

The master cylinder 3 is connected to the brake pedal 2 via the push rod 2a, and is also replenished with the brake fluid from a reservoir tank 4. The reservoir tank 4 is a brake fluid source that stores the brake fluid therein, and is a low-pressure portion opened to the atmospheric pressure. A bottom portion side (a vertically lower side) inside the reservoir tank 4 is partitioned into a primary hydraulic chamber space 41P, a secondary hydraulic chamber space 41S, and a pump intake space 42 by a plurality of partition members each having a predetermined height. The master cylinder 3 is a tandem-type master cylinder, and includes a primary piston 32P and a secondary piston 32S in series as master cylinder pistons axially movable according to the brake operation. The primary piston 32P is connected to the push rod 2a. The secondary piston 32S is configured as a free piston.

A stroke sensor 90 is provided on the brake pedal 2. The stroke sensor 90 detects the amount of a displacement of the brake pedal 2 (a pedal stroke S). The stroke sensor 90 may be provided on the push rod 2a or the primary piston 32P to detect the stroke S. The pedal stroke S corresponds to a value acquired by multiplying the amount of an axial displacement of the push rod 2a or the primary piston 32P (a stroke amount) by a pedal ratio K of the brake pedal. The pedal ratio K is the ratio of the pedal stroke S to the stroke amount of the primary piston 32P, and is set to a predetermined value. The pedal ratio K can be calculated based on, for example, the ratio of the distance from the shaft 201 to the pad 202 to the distance from the shaft 201 to the shaft 203.

A stroke simulator 5 is actuated in reaction to the brake operation performed by the driver. The stroke simulator 5 generates the pedal stroke S with the aid of an inflow of the brake fluid transmitted out from inside the master cylinder 3 according to the brake operation performed by the driver into the stroke simulator 5. A piston 52 of the stroke simulator 5 is actuated axially in a cylinder 50 due to the brake fluid supplied from the master cylinder 3. By this operation, the stroke simulator 5 generates an operation reaction force according to the brake operation performed by the driver.

A hydraulic pressure control unit 6 can apply the braking torque to each of the front wheels FL and FR independently of the brake operation performed by the driver. An electronic control unit (this is a control unit and hereinafter will be referred to as an ECU) 100 controls the actuation of the hydraulic pressure control unit 6. The hydraulic pressure control unit 6 receives supply of the brake fluid from the reservoir tank 4 or the master cylinder 3. The hydraulic pressure control unit 6 is provided between the wheel cylinders 8 and the master cylinder 3, and can supply the master cylinder hydraulic pressure or a control hydraulic pressure to each of the wheel cylinders 8 individually.

An electric brake unit 9 can apply the braking torque to each of the rear wheels RL and RR independently of the brake operation performed by the driver. An ECU 200 controls the actuation of the electric brake unit 9. The ECU 100 and the ECU 200 communicate with each other via a communication line 110.

The hydraulic pressure control unit 6 includes a motor 7a of a pump 7 and a plurality of control valves (communication valves 26 and the like) as actuators for generating the control hydraulic pressure. The pump 7 sucks the brake fluid therein from the reservoir tank 4, and discharges the brake fluid toward the wheel cylinders 8. The pump 7 include five plunger pumps. The motor 7a is, for example, a brushed motor. The communication valves 26 and the like perform opening/closing operations according to control signals to thus switch communication states of first fluid passages 11 and the like, thereby controlling the flow of the brake fluid. The hydraulic pressure control unit 6 increases the pressures in the wheel cylinders 8 with use of a brake hydraulic pressure generated by the pump 7 with the master cylinder 3 and the wheel cylinders 8 out of communication with each other. Further, the hydraulic pressure control unit 6 includes pressure sensors 91 and 92, which detect the master cylinder hydraulic pressure and the discharge pressure of the pump 7, respectively.

Information regarding a running state transmitted from the vehicle side (a wheel speed and the like) is input to the ECU 100 in addition to detection values transmitted from the stroke sensor 90 and the pressure sensors 91 and 92. The ECU 100 performs information processing according to a built-in program based on the input various kinds of information, thereby calculating a target wheel cylinder hydraulic pressure of each of the wheel cylinders 8a and 8b and a target motor thrust force of the electric brake unit 9. The ECU 100 outputs an instruction signal to each of the actuators in the hydraulic pressure control unit 6 in such a manner that the wheel cylinder hydraulic pressures in the wheel cylinders 8a and 8b each match the target wheel cylinder hydraulic pressure. Further, the ECU 100 outputs a request to cause the motor thrust force of the electric brake unit 9 to match the target motor thrust force to the ECU 200. The ECU 200 controls an electric motor in such a manner that the motor thrust force of the electric brake unit 9 matches the target motor thrust force. As a result, the brake control apparatus 1 can realize various kinds of brake control (boosting control, anti-lock control, brake control for vehicle motion control, autonomous brake control, regenerative cooperative brake control, and the like). The boosting control assists the brake operation by generating a brake hydraulic pressure by which the brake pressing force input by the driver is insufficient. The anti-lock control prevents a braking slip (a lock tendency) of each of the wheels FL to RR. The vehicle motion control is vehicle behavior stabilization control for preventing a sideslip and the like. The autonomous brake control is preceding vehicle following control, autonomous emergency braking, and the like. The regenerative cooperative brake control controls the wheel cylinder hydraulic pressure and the motor thrust force so as to achieve a target deceleration in cooperation with the regenerative brake.

The primary hydraulic chamber 31P is defined between the two pistons 32P and 32S of the master cylinder 3. A compression coil spring 33P is set in the primary hydraulic chamber 31P. The secondary hydraulic chamber 31S is defined between the secondary piston 32S and the bottom portion of the cylinder 30. A compression coil spring 33S is set in the secondary hydraulic chamber 31S. The first fluid passage 11 is opened to each of the hydraulic chambers 31P and 31S. Each of the hydraulic chambers 31P and 31S is provided so as to be connectable to the hydraulic pressure control unit 6 and be also communicable with the wheel cylinders 8 via the first fluid passage 11.

The driver's operation of pressing the brake pedal 2 causes the strokes of the pistons 32, thereby generating the master cylinder hydraulic pressures according to reductions in the volumes of the hydraulic chambers 31. Approximately equal master cylinder hydraulic pressures are generated in the two hydraulic chambers 31P and 31S. As a result, the brake fluid is supplied from the hydraulic chambers 31 toward the wheel cylinders 8 via the first fluid passages 11. The master cylinder 3 can increase the pressure in the wheel cylinder 8a of the P system via a fluid passage (a first fluid passage 11P) of the P system with use of the master cylinder hydraulic pressure generated in the primary hydraulic chamber 31P. Further, the master cylinder 3 can increase the pressure in the wheel cylinder 8b of the S system via a fluid passage of the S system (a first fluid passage 11S) with use of the master cylinder hydraulic pressure generated in the secondary hydraulic chamber 31S.

The stroke simulator 5 includes the cylinder 50, the piston 52, and a spring 53. The cylinder 50 has a cylindrical inner peripheral surface. The cylinder 50 includes a piston containing portion 501 and a spring containing portion 502. The piston containing portion 501 is smaller in diameter than the spring containing portion 502. A fluid passage 13 (13A), which will be described below, is constantly opened on the inner peripheral surface of the spring containing portion 502.

The piston 52 is movable in the piston containing portion 501 in the axial direction of the piston containing portion 501. The piston 52 divides the inside of the cylinder 50 into a positive pressure chamber 511 and a back-pressure chamber 512. A second fluid passage 12 is constantly opened to the positive pressure chamber 511. The third fluid passage 13A is constantly opened to the back-pressure chamber 512. A piston seal 54 is set on the outer periphery of the piston 52 so as to extend in the direction around the central axis of the piston 52 (the circumferential direction). The piston seal 54 is in sliding contact with the inner peripheral surface of the piston containing portion 501, and seals between the inner peripheral surface of the piston containing portion 501 and the outer peripheral surface of the piston 52. The piston seal 54 is a separation seal member that seals between the positive pressure chamber 511 and the back-pressure chamber 512 to thereby liquid-tightly separate them, and complements the function of the piston 52. The spring 53 is a compression coil spring set in the back-pressure chamber 512, and biases the piston 52 from the back-pressure chamber 512 side toward the positive pressure chamber 511 side. The spring 53 generates a reaction force according to a compression amount. The spring 53 includes a first spring 531 and a second spring 532. The first spring 531 is smaller in diameter and shorter in length than the second spring 532, and has a short wire diameter. The spring constant of the first spring 531 is smaller than the spring constant of the second spring 532. The first spring 531 and the second spring 532 are disposed in series between the piston 52 and the spring containing portion 502 via a retainer member 530.

The first fluid passages 11 connect the hydraulic chambers 31 of the master cylinder 3 and the wheel cylinders 8 to each other therebetween. Shut-off valves (a shut-off valve portion) 21 are normally-opened (opened when no power is supplied) electromagnetic proportional valves provided in the first fluid passages 11. Electromagnetic proportional valves can be opened at a degree adjustable according to an electric current supplied to the solenoid. Each of the first fluid passages 11 is divided into a first fluid passage 11A on the master cylinder 3 side and a first fluid passage 11B on the wheel cylinder 8 side by the shut-off valve 21.

Solenoid IN valves (SOL/V INs) 25 are normally-opened electromagnetic proportional valves respectively provided in correspondence with the wheels FL and FR (first fluid passages 11a and 11b) on the wheel cylinder 8 side (the first fluid passages 11B) with respect to the shut-off valves 21 in the first fluid passages 11. Bypass fluid passages 110 are provided in the first fluid passages 11. The bypass fluid passages 110 bypass the SOL/V INs 25. A left-side check valve 250 is provided in each of the bypass fluid passages 110. The left-side check valve 250 permits only a flow of the brake fluid from the wheel cylinder 8 side toward the master cylinder 3 side.

An intake fluid passage 15 connects the pump intake space 42 in the reservoir tank 4 and an intake portion 70 of the pump 7 to each other therebetween. An internal reservoir 29 is provided on the way of the intake fluid passage 15 inside the hydraulic pressure control unit 6. The internal reservoir 29 is a fluid pool capable of storing the brake fluid therein and having a predetermined volume. A discharge fluid passage 16 connects a discharge portion 71 of the pump 7 and portions in the first fluid passages 11B between the shut-off valves 21 and the SOL/V INs 25. A check valve 160 is provided in the discharge fluid passage 16, and permits only a flow from one side where the discharge portion 71 of the pump 7 is located to another side where the first fluid passages 11 are located. The check valve 160 is a discharge valve provided to the pump 7. The discharge fluid passage 16 branches into a discharge fluid passage 16P of the P system and a discharge fluid passage 16S of the S system on the downstream side of the check valve 160. The individual discharge fluid passages 16P and 16S are connected to the first fluid passage 11P of the P system and the first fluid passage 11S of the S system, respectively. The discharge fluid passages 16P and 16S function as a communication passage connecting the first fluid passages 11P and 11S to each other. Communication valves 26 are normally-closed (closed when no power is supplied) ON/OFF valves provided in the discharge fluid passages 16. The opening/closing of ON/OFF valves is controlled to be switched in a binary manner.

The pump 7 is a hydraulic pressure source capable of generating the wheel cylinder hydraulic pressures by generating the hydraulic pressures in the first fluid passages 11 with use of the brake fluid supplied from the reservoir tank 4. The pump 7 is connected to the wheel cylinders 8a and 8b via the discharge fluid passages 16P and 16S and the first fluid passages 11P and 11S, and can increase the pressures in the wheel cylinders 8 by discharging the brake fluid to the discharge fluid passages 16P and 16S.

A first pressure reduction fluid passage 17 connects a portion in the discharge fluid passage 16 between the check valves 160 and the communication valves 26, and the intake fluid passage 15 to each other. A pressure adjustment valve 27 is provided in the first pressure reduction fluid passage 17. The pressure adjustment valve 27 is a normally-closed electromagnetic proportional valve. Second pressure reduction fluid passages 18 connect the wheel cylinder 8 side of the first fluid passages 11B with respect to the SOL/INs 25, and the intake fluid passage 15 to each other. Solenoid OUT valves (SOL/V OUTs) 28 are normally-closed ON/OFF valves provided in the second pressure reduction fluid passages 18. In the first embodiment, the first pressure reduction fluid passage 17 on the intake fluid passage 15 side with respect to the pressure adjustment valve 27, and the second pressure reduction fluid passages 18 on the intake fluid passage 15 side with respect to the SOL/V OUTs 28 share a part thereof with each other. The second fluid passage 12 branches off from the first fluid passage 11A of the P system to be connected to the positive pressure chamber 511 of the stroke simulator 5. The hydraulic pressure control unit 6 may be configured in such a manner that the second fluid passage 12 directly connects the primary hydraulic chamber 31P and the positive pressure chamber 511 to each other without the intervention of the first fluid passage 11B.

The third fluid passage 13 connects the back-pressure chamber 512 of the stroke simulator 5 and the fluid passages 11 to each other therebetween. More specifically, the third fluid passage 13 branches off from a portion in the first fluid passage 11P (11B) between the shut-off valve 21P and the SOL/V IN 25, and is connected to the back-pressure chamber 512. A stroke simulator IN valve (SS/V IN) 23 is a normally-closed ON/OFF valve provided in the third fluid passage 13. The third fluid passage 13 is divided into a third fluid passage 13A on the back-pressure chamber 512 side and a third fluid passage 13B on the first fluid passage 11 side by the SS/V IN 23. A bypass fluid passage 130 is provided in parallel with the third fluid passage 13 while bypassing the SS/V IN 23. The bypass fluid passage 130 connects the third fluid passage 13A and the third fluid passage 13B to each other therebetween. A check valve 230 is provided in the bypass fluid passage 130. The check valve 230 permits a flow of the brake fluid heading from the back-pressure chamber 512 side (the third fluid passage 13A) toward the first fluid passage 11 side (the third fluid passage 13B), and prohibits a flow of the brake fluid in the opposite direction therefrom.

A fourth fluid passage 14 connects the back-pressure chamber 512 of the stroke simulator 5 and the reservoir tank 4 to each other. The fourth fluid passage 14 connects a portion in the third fluid passage 13 between the back-pressure chamber 512 and the SS/V IN 23 (the third fluid passage 13A), and the intake fluid passage 15 (or the first pressure reduction fluid passage 17 on the intake fluid passage 15 side with respect to the pressure adjustment valve 27, and the second pressure reduction fluid passages 18 on the intake fluid passage 15 side with respect to the SOL/V OUTs 28). The fourth fluid passage 14 may be directly connected to the back-pressure chamber 512 or the reservoir tank 4.

A stroke simulator OUT valve (SS/V OUT) 24 is a normally-closed ON/OFF valve provided in the fourth fluid passage 14. A bypass fluid passage 140 is provided in parallel with the fourth fluid passage 14 while bypassing the SS/V OUT 24. A check valve 240 is provided in the bypass fluid passage 140. The check valve 240 permits a flow of the brake fluid heading from the reservoir tank 4 (the intake fluid passage 15) side toward the third fluid passage 13A side, i.e., toward the back-pressure chamber 512 side, and prohibits a flow of the brake fluid in the opposite direction therefrom.

The master cylinder pressure sensor (a first pressure sensor) 91 is provided between the shut-off valve 21P and the master cylinder 3 (the first fluid passage 11A) in the first fluid passage 11P. The master cylinder pressure sensor 91 detects a hydraulic pressure at this portion (the master cylinder hydraulic pressure and the hydraulic pressure in the positive pressure chamber 511 of the stroke simulator 5).

The discharge pressure sensor (a second pressure sensor) 92 is provided between the discharge portion 71 of the pump 7 (the check valve 160) and the communication valves 26 in the discharge fluid passage 16. The discharge pressure sensor 92 detects a hydraulic pressure at this portion (a pump discharge pressure). A first system is formed by a brake system (the first fluid passages 11) that connects the hydraulic chambers 31 of the master cylinder 3 and the wheel cylinders 8 to each other therebetween with the shut-off valves 21 opened. This first system can realize pressing force braking (non-boosting control) by generating the wheel cylinder hydraulic pressures from the master cylinder hydraulic pressures generated with use of the pressing force. On the other hand, a second system is formed by a brake system (the intake fluid passage 15, the discharge fluid passage 16, and the like) that includes the pump 7 and connects the reservoir tank 4 and the wheel cylinders 8 to each other therebetween with the shut-off valves 21 closed. This second system constructs a so-called brake-by-wire device, which generates the wheel cylinder hydraulic pressures from the hydraulic pressure generated with use of the pump 7, and can realize the boosting control and the like as brake-by-wire control. At the time of the brake-by-wire control (hereinafter simply referred to as by-wire control), the stroke simulator 5 generates the operation reaction force according to the brake operation performed by the driver.

The ECU 100 includes a by-wire control portion 101, a pressing force braking portion 102, and a fail-safe portion 103.

The by-wire control portion 101 closes the shut-off valves 21 and actuates the pump 7 according to a state of the brake operation performed by the driver, thereby increasing the pressures in the wheel cylinders 8. The by-wire control portion 101 includes a brake operation state detection portion 104, a target value calculation portion 105, and a wheel cylinder hydraulic pressure control portion 106.

The brake operation state detection portion 104 detects the pedal stroke S as the brake operation amount input by the driver upon receiving the input of the detection value of the stroke sensor 90. Further, the brake operation state detection portion 104 detects whether the driver is performing the brake operation (whether the brake pedal 2 is being operated) based on the pedal stroke S. Alternatively, the brake operation amount may be acquired by providing a pressing force sensor that detects the pressing force and detecting or estimating the brake operation amount based on a detection value thereof. Alternatively, the brake operation amount may be detected or estimated based on the detection value of the master cylinder pressure sensor 91. In other words, the brake operation amount used for the control is not limited to the pedal stroke S, and another appropriate value may be used therefor.

The target value calculation portion 105 calculates the target wheel cylinder hydraulic pressure and the target motor thrust force. For example, at the time of the boosting control, the target value calculation portion 105 calculates a braking torque on each of the wheels FL to RR that realizes an ideal relationship between the pedal stroke S and the vehicle deceleration requested by the driver according to a predetermined boosting ratio based on the detected pedal stroke S, and calculates the target wheel cylinder hydraulic pressure for each of the front wheels FL and FR and the target motor thrust force for each of the rear wheels RL and RR for realizing this braking torque. The target motor thrust force is output to the ECU 200.

The wheel cylinder hydraulic pressure control portion 106 actuates the shut-off valves 21 in the valve-closing directions, thereby bringing the hydraulic pressure control unit 6 into a state capable of generating the wheel cylinder hydraulic pressures with use of the pump 7 (the second system) (pressure increase control). The wheel cylinder hydraulic pressure control portion 106 controls each of the actuators in the hydraulic pressure control unit 6 in this state, thereby performing hydraulic pressure control (for example, the boosting control) that realizes the target wheel cylinder hydraulic pressure. More specifically, the wheel cylinder hydraulic pressure control portion 106 actuates the shut-off valves 21 in the valve-closing directions, the communication valves 26 in the valve-opening directions, and the pressure adjustment valve 27 in the valve-closing direction, and also actuates the pump 7. Controlling each of the actuators in this manner allows desired brake fluid to be transmitted from the reservoir tank 4 side to the wheel cylinders 8 via the intake fluid passage 15, the pump 7, the discharge fluid passage 16, and the first fluid passages 11.

The brake fluid discharged from the pump 7 flows into the first fluid passages 11B via the discharge fluid passage 16. The pressure in each of the wheel cylinders 8 is increased due to an inflow of this brake fluid into each of the wheel cylinders 8. In other words, the pressure in each of the wheel cylinders 8 is increased with use of the hydraulic pressure generated in the first fluid passage 11B by the pump 7. At this time, the desired braking force can be acquired by performing feedback control on the number of times that the pump 7 rotates and the valve-opening state (the opening degree or the like) of the pressure adjustment valve 27 so that the wheel cylinder hydraulic pressures estimated based on the detection value of the discharge pressure sensor 92 are adjusted closer to the target wheel cylinder hydraulic pressure. In other words, the wheel cylinder hydraulic pressures can be adjusted by controlling the valve-opening state of the pressure adjustment valve 27 and discharging the brake fluid from the discharge fluid passage 16 or the first fluid passages 11 to the intake fluid passage 15 via the pressure adjustment valve 27 as appropriate. Actuating the shut-off valves 21 in the valve-closing directions to block the communication between the master cylinder 3 side and the wheel cylinder 8 side facilitates the control of the wheel cylinder hydraulic pressures independent of the brake operation performed by the driver.

The wheel cylinder hydraulic pressures are maintained by actuating the communication valves 26 in the valve-closing directions after allowing the wheel cylinder hydraulic pressures to achieve the target wheel cylinder hydraulic pressure. After that, the pump 7 (the motor 7a) is stopped and the pressure adjustment valve 27 is actuated in the valve-opening direction. This can save electric power consumption when the wheel cylinder hydraulic pressures do not have to be increased/reduced.

On the other hand, the wheel cylinder hydraulic pressure control portion 106 actuates the SS/V OUT 24 in the valve-opening direction. As a result, the communication is established between the back-pressure chamber 512 of the stroke simulator 5 and the intake fluid passage 15 (the reservoir tank 4) side. Therefore, when the brake fluid is discharged from the master cylinder 3 according to the operation of pressing the brake pedal 2 and this brake fluid flows into the positive pressure chamber 511 of the stroke simulator 5, the piston 52 is actuated. As a result, the pedal stroke S is generated. The brake fluid flows out from the back-pressure chamber 512 by a fluid amount equivalent to the fluid amount flowing into the positive pressure chamber 511. This brake fluid is discharged toward the intake fluid passage 15 (the reservoir tank 4) side via the third fluid passage 13A and the fourth fluid passage 14. The fourth fluid passage 14 only has to be connected to a low-pressure portion into which the brake fluid can flow, and does not necessarily have to be connected to the reservoir tank 4. Further, the operation reaction force applied to the brake pedal 2 (the pedal reaction force) is generated due to the force with which the spring 53 of the stroke simulator 5, the hydraulic pressure in the back-pressure chamber 512, and the like press the piston 52. In other words, the stroke simulator 5 generates the characteristic of the brake pedal 2 (an F-S characteristic, which is the relationship of the pedal stroke S to the pressing force F) at the time of the by-wire control.

The pressing force braking portion 102 opens the shut-off valves 21, thereby increasing the pressures in the wheel cylinders 8 with use of the master cylinder 3. The pressing force braking portion 102 actuates the shut-off valves 21 in the valve-opening directions, thereby bringing the hydraulic pressure control unit 6 into a state capable of generating the wheel cylinder hydraulic pressures from the master cylinder hydraulic pressures (the first system), thus realizing the pressing force braking. At this time, the pressing force braking portion 102 actuates the SS/V OUT 24 in the valve-closing direction, thereby making the stroke simulator 5 inactive in reaction to the brake operation performed by the driver. As a result, the brake fluid is efficiently supplied from the master cylinder 3 toward the wheel cylinders 8. Therefore, the wheel cylinder hydraulic pressures that the driver generates with the pressing force can be prevented from reducing. More specifically, the pressing force braking portion 102 brings the hydraulic pressure control unit 6 into a deactuated state. The SS/V IN 23 may be controlled in the valve-opening direction.

The fail-safe portion 103 detects occurrence of an abnormality (a failure or a malfunction) in the brake control apparatus 1. For example, the fail-safe portion 103 detects a failure in the actuator (the pump 7, the motor 7a, the pressure adjustment valve 27, or the like) in the hydraulic pressure control unit 6 based on a signal from the brake operation state detection portion 104 and the signal from each of the sensors. Alternatively, the fail-safe portion 103 detects an abnormality in an in-vehicle power source (a battery) that supplies electric power to the brake control apparatus 1, or the ECU 100. When detecting the occurrence of an abnormality during the by-wire control, the fail-safe portion 103 switches the control according to the state of the abnormality. For example, when the hydraulic pressure control based on the by-wire control is determined to be unable to continue, the fail-safe portion 103 actuates the pressing force braking portion 102, thereby switching the control from the by-wire control to the pressing force control. More specifically, the fail-safe portion 103 brings all of the actuators in the hydraulic pressure control unit 6 into the deactuated states, thereby causing the brake control apparatus 1 to transition to the pressing force braking. The shut-off valves 21 are the constantly-opened valves. This allows the shut-off valves 21 to be kept opened, thereby being able to automatically realize the pressing force braking, when a failure has occurred in the electric power source. The SS/V OUT 24 is the normally-closed valve. Therefore, when a failure has occurred in the electric power source, the SS/V OUT 24 is closed, thereby allowing the stroke simulator 5 to be automatically deactuated. The communication valves 26 are the normally-closed valves. This allows the two brake hydraulic systems to operate independently of each other, thereby allowing each of the systems to increase the pressure in the wheel cylinder 8 according to the pressing force separately from each other, when a failure has occurred in the electric power source.

Now, the brake control apparatus 1 according to the first embodiment includes only the discharge pressure sensor 92 as a pressure sensor that detects the hydraulic pressure in portions of the first fluid passages 11 that are located downstream of the shut-off valves 21 (the wheel cylinder 8 side), i.e., in the route in which the pressure is increased using the pump 7. This makes it impossible to employ the method that compares the output values with another pressure sensor provided in the same route (the route in which the pressure is increased using the pump 7) to detect an abnormality in the discharge pressure sensor 92. Under these circumstances, the fail-safe portion 103 performs abnormality diagnosis processing performed in the following manner with the aim of improving the detectability for an abnormality in the pressure sensor.

Figure 2:
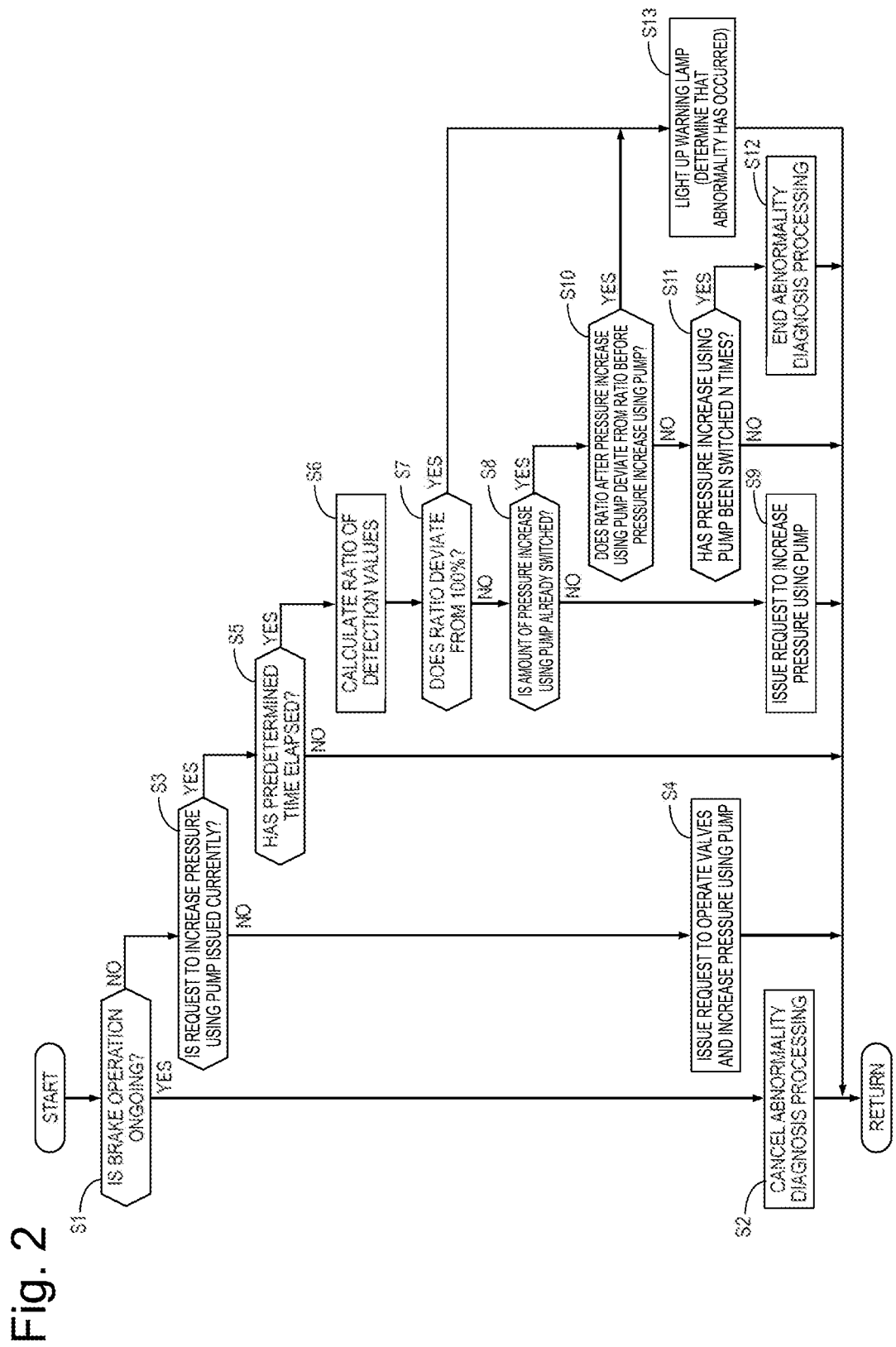
FIG. 2 is a flowchart illustrating a flow of abnormality diagnosis processing by a fail-safe portion 103.

FIG. 2 is a flowchart illustrating a flow of the abnormality diagnosis processing by the fail-safe portion 103. This processing is performed, for example, immediately after the ignition switch is turned on.

In step S1, the fail-safe portion 103 determines whether the driver is performing the brake operation based on a result of the detection of the brake operation state by the brake operation state detection portion 104. If the determination in step S1 is YES, the processing proceeds to step S2. If the determination in step S1 is NO, the processing proceeds to step S3.

In step S2, the fail-safe portion 103 cancels the abnormality diagnosis processing.

In step S3, the fail-safe portion 103 determines whether a request to increase the pressure using the pump is currently issued. If the determination in step S3 is YES, the processing proceeds to step S5. If the determination in step S3 is NO, the processing proceeds to step S4.

In step S4, the fail-safe portion 103 requests the wheel cylinder hydraulic pressure control portion 106 to operate the valves and increase the pressure using the pump. More specifically, the fail-safe portion 103 outputs a request to actuate the shut-off valve 21S of the S system in the valve-closing direction, actuate the communication valve 26P of the P system in the valve-opening direction, actuate the SOL/V IN 25a of the P system in the valve-closing direction, actuate the pressure adjustment valve 27 in the valve-closing direction, and drive the motor 7a with a predetermined number of rotations from the state in which all of the actuators are deactuated (the state in FIG. 1) in the hydraulic pressure control unit 6.

In step S5, the fail-safe portion 103 determines whether a predetermined time has elapsed since when the request to operate the valves and increase the pressure using the pump has been issued. If the determination in step S5 is YES, the processing proceeds to step S6. If the determination in step S5 is NO, the processing proceeds to RETURN.

In step S6, the fail-safe portion 103 calculates R=Pmc/Ppump, which is a ratio of a detection value Pmc of the master cylinder pressure sensor 91 to a detection value Ppump of the discharge pressure sensor 92 (a comparison value).

In step S7, the fail-safe portion 103 determines whether the latest ratio R deviates from 100%. If the determination in step S7 is YES, the processing proceeds to step S13. If the determination in step S7 is NO, the processing proceeds to step S8. In this step, the fail-safe portion 103 determines that the ratio R deviates from 100% if the ratio R falls outside a predetermined normal range (for example, 95 to 100%).

In step S8, the fail-safe portion 103 determines whether an amount of the pressure increase using the pump is already switched, i.e., the discharge flow amount of the pump 7 is increased by a predetermined amount. If the determination in step S8 is YES, the processing proceeds to step S10. If the determination in step S8 is NO, the processing proceeds to step S9.

In step S9, the fail-safe portion 103 requests the wheel cylinder hydraulic pressure control portion 106 to increase the pressure using the pump, i.e., increase the number of rotations of the motor 7a by a predetermined number of rotations.

In step S10, the fail-safe portion 103 determines whether a ratio Rn+1 (n is a natural number) after the pressure is increased using the pump deviates from the ratio Rn before the pressure is increased using the pump. If the determination in step S10 is YES, the processing proceeds to step S13. If the determination in step S10 is NO, the processing proceeds to step S11. In this step, the fail-safe portion 103 determines that Rn+1 deviates from Rn if Rn+1 and Rn are different from each other by, for example, 5% or more.

In step S11, the fail-safe portion 103 determines whether the amount of the pressure increase using the pump has been switched n times (for example, twice). If the determination in step S11 is YES, the processing proceeds to step S12. If the determination in step S11 is NO, the processing proceeds to step S9.

In step S12, the fail-safe portion 103 diagnoses that the pressure sensors are normal, and ends the abnormality diagnosis processing.

In step S13, the fail-safe portion 103 diagnoses that an abnormality has occurred in the pressure sensor and lights up a warning lamp provided on an instrument panel, and ends the abnormality diagnosis processing.

If diagnosing that an abnormality has occurred in the pressure sensor, the fail-safe portion 103 switches the brake control from the by-wire control to the pressing force braking.

Next, functions and advantageous effects of the first embodiment will be described.

Figure 3:
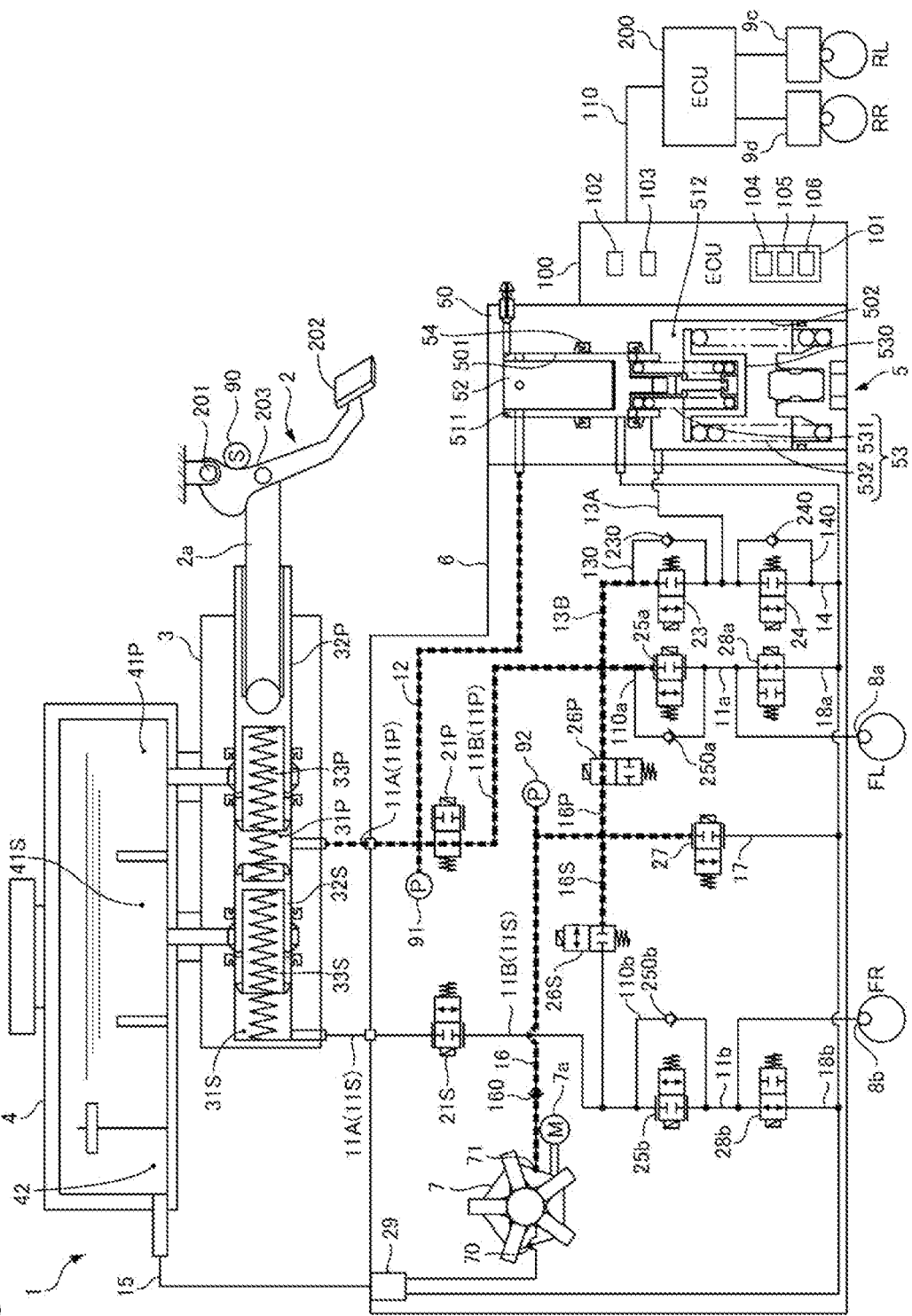
FIG. 3 illustrates the state of each actuator in the abnormality diagnosis processing according to the first embodiment.

The fail-safe portion 103 confirms the operation state of the brake pedal 2, and starts the abnormality diagnosis processing when the brake pedal 2 is not operated. The fail-safe portion 103 actuates the pump 7 with only the shut-off valve 21P and the communication valve 26P of the P system opened and the other valves closed as illustrated in FIG. 3. Opening the shut-off valve 21P and the communication valve 26P brings the first fluid passage 11A, the first fluid passage 11B, and the discharge fluid passage 16 into a state in communication with one another. When the pump 7 is actuated from this state, the brake fluid sucked from the reservoir tank 4 into the pump 7 is discharged into the discharge fluid passage 16, and is returned to the reservoir tank 4 via the first fluid passage 11B, the first fluid passage 11A, and the primary hydraulic chamber 31P of the master cylinder 3. At this time, the primary hydraulic chamber 31P has high flow passage resistance compared to the fluid passages such as the first fluid passage 11A, and therefore the hydraulic pressure in the route indicated by a broken line in FIG. 3 exceeds the pressure of the brake fluid reserved in the reservoir (the atmospheric pressure).

The fail-safe portion 103 calculates the ratio R of the detection value Pmc of the master cylinder pressure sensor 91 to the detection value Ppump of the discharge pressure sensor 92 after the above-described pump operation and the pressure increase using the pump. When the ratio R deviates from 100%, the fail-safe portion 103 diagnoses that an abnormality has occurred in the pressure sensor, and warns the driver by lightening up the warning lamp. When the ratio R does not deviate from 100%, the fail-safe portion 103 increases the hydraulic pressures in the first fluid passages 11A and 11B by increasing the discharge fluid amount of the pump 7, and calculates the ratio Rn+1 again and diagnoses an abnormality in the pressure sensor. This pressure increase using the pump and the abnormality diagnosis are conducted twice. Further, even when the ratio Rn+1 does not deviate from 100%, the fail-safe portion 103 diagnoses that an abnormality has occurred in the pressure sensor and warns the driver by lightening up the warning lamp if the ratio Rn+1 deviates from the ratio Rn before the pressure increase using the pump. If not diagnosing that an abnormality has occurred in the pressure sensor even after increasing the pressure using the pump for the second time, the fail-safe portion 103 diagnoses that the pressure sensors are normal and ends the abnormality diagnosis processing.

Figure 4:
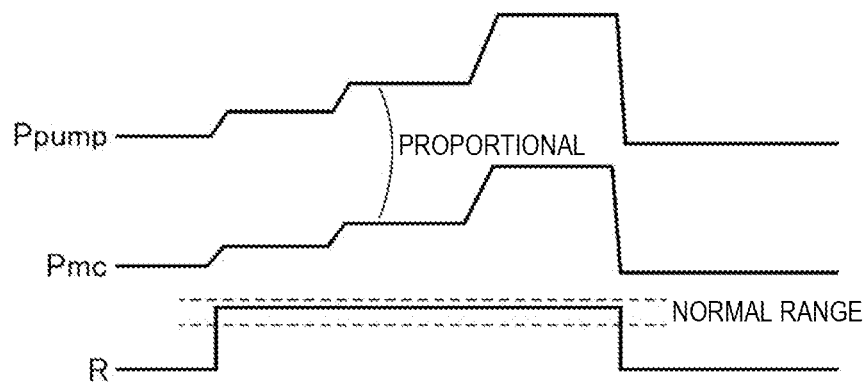
FIG. 4 is a timing chart of Ppump, Pmc, and R in the abnormality diagnosis processing when a master cylinder pressure sensor 91 and a discharge pressure sensor 92 are normal.

FIG. 4 is a timing chart of Ppump, Pmc, and R in the abnormality diagnosis processing when the master cylinder pressure sensor 91 and the discharge pressure sensor 92 are normal.

In the abnormality diagnosis processing, the brake fluid in the reservoir tank 4 that is sucked by the pump 7 is returned into the reservoir tank 4 via the discharge fluid passage 16P, the first fluid passage 11B, the first fluid passage 11A, and the primary hydraulic chamber 31P after being discharged into the discharge fluid passage 16. At this time, a pressure loss occurs due to the restrictor (the communication valve 26P and the shut-off valve 21P), and therefore the detection value Pmc of the master cylinder pressure sensor 91 exhibits a smaller value than the detection value Ppump of the discharge pressure sensor 92 but the two detection values Pmc and Ppump are always kept in a constant proportional relationship regardless of the discharge fluid amount of the pump 7 when both the pressure sensors 91 and 92 are normal. Therefore, when three ratios R1, R2, and R3 acquired while the amount of the pressure increase using the pump is switched always fall within a constant and normal range, it can be determined that both the pressure sensors 91 and 92 are normal.

Figure 5:
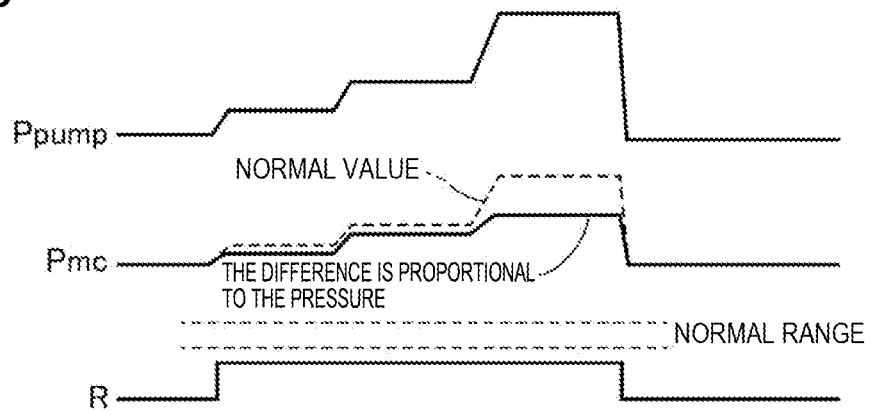
FIG. 5 is a timing chart of Ppump, Pmc, and R in the abnormality diagnosis processing when a gain abnormality has occurred in the master cylinder pressure sensor 91.

FIG. 5 is a timing chart of Ppump, Pmc, and R in the abnormality diagnosis processing when a gain abnormality has occurred in the master cylinder pressure sensor 91.

When the gain abnormality has occurred in the master cylinder pressure sensor 91, the amount of the difference of the detection value Pmc from the normal value increases proportionally to the hydraulic pressure in the first fluid passage 11A. Therefore, when the three ratios R1, R2, and R3 acquired while the amount of the pressure increase using the pump is switched always fall outside the constant and normal range, it can be determined that one of the two pressure sensors 91 and 92 is abnormal.

Figure 6:
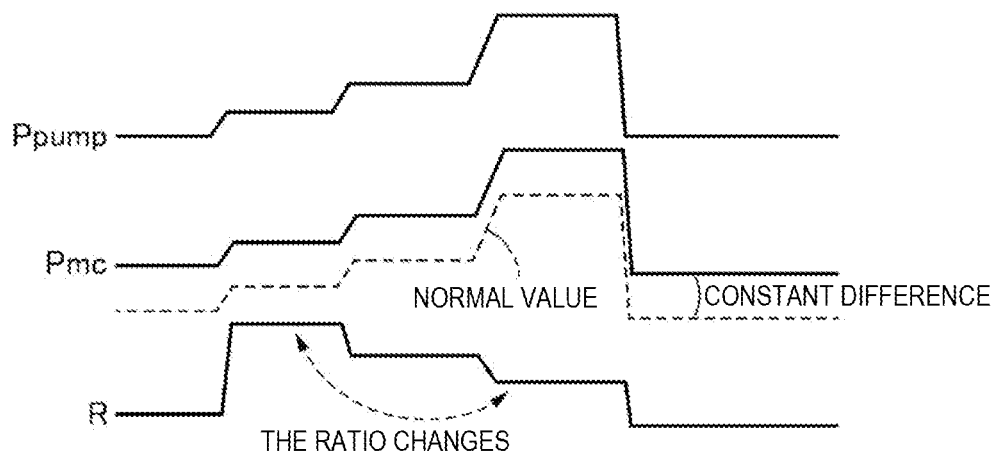
FIG. 6 is a timing chart of Ppump, Pmc, and R in the abnormality diagnosis processing when an offset abnormality has occurred in the master cylinder pressure sensor 91.

FIG. 6 is a timing chart of Ppump, Pmc, and R in the abnormality diagnosis processing when an offset abnormality has occurred in the master cylinder pressure sensor 91.

When the offset abnormality has occurred in the master cylinder pressure sensor 91, the amount of the difference of the detection value Pmc from the normal value is always constant regardless of the hydraulic pressure in the first fluid passage 11A. Therefore, the ratio R changes between before and after the amount of the pressure increase using the pump is switched. Therefore, when there is a change in the three ratios R1, R2, and R3 acquired while the amount of the pressure increase using the pump is switched, it can be determined that one of the two pressure sensors 91 and 92 is abnormal.

Figure 7:
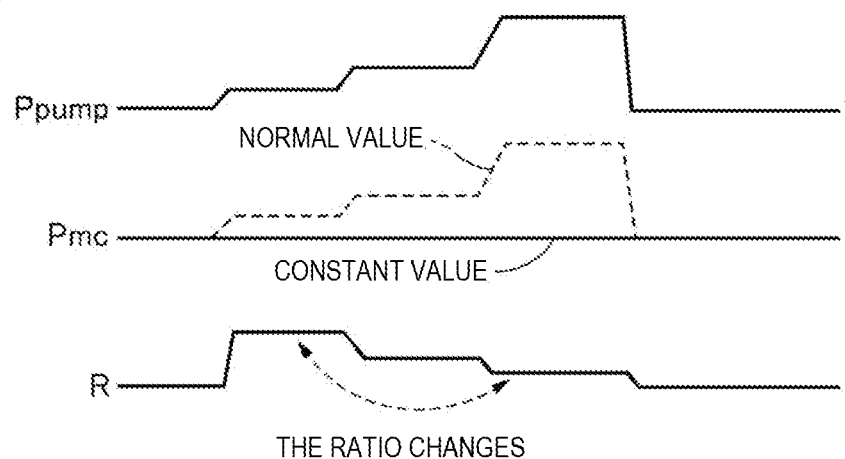
FIG. 7 is a timing chart of Ppump, Pmc, and R in the abnormality diagnosis processing when a sticking abnormality has occurred in the master cylinder pressure sensor 91.

FIG. 7 is a timing chart of Ppump, Pmc, and R in the abnormality diagnosis processing when a sticking abnormality has occurred in the master cylinder pressure sensor 91.

When the sticking abnormality has occurred in the master cylinder pressure sensor 91, the amount of the difference of the detection value Pmc from the normal value changes according to the hydraulic pressure in the first fluid passage 11A. Therefore, when there is a change in the three ratios R1, R2, and R3 acquired while the amount of the pressure increase using the pump is switched, it can be determined that one of the two pressure sensors 91 and 92 is abnormal.

In this manner, in the abnormality diagnosis processing, the ECU 100 determines an abnormality in the master cylinder pressure sensor 91 or the discharge pressure sensor 92 based on the detection value Pmc of the master cylinder pressure sensor 91 and the detection value Ppump of the discharge pressure sensor 92 after actuating the shut-off valve 21P in the valve-opening direction and actuating the pump 7. In other words, the ECU 100 causes the master cylinder pressure sensor 91 and the discharge pressure sensor 92 in the first fluid passage 11A and the discharge fluid passage 16, respectively, which are isolated from each other by the shut-off valve 21P during the normal braking (the by-wire control), to be placed in the same route in which the pressure is increased using the pump 7, and then increases the pressure in this route using the pump and compares the detection values Pmc and Ppump of the two pressure sensors 91 and 92. The detectability for an abnormality in the pressure sensor 91 or 92 can be improved by comparing the detection values Pmc and Ppump of the pressure sensors 91 and 92 placed in the same route.

The ECU 100 determines an abnormality in the master cylinder hydraulic pressure sensor 91 or the discharge pressure sensor 92 based on the ratio R of the detection value Pmc of the master cylinder pressure sensor 91 to the detection value Ppump of the discharge pressure sensor 92. As a result, the ECU 100 can accurately determine whether an abnormality has occurred in one of the two pressure sensors 91 and 92 provided in the route through which the brake fluid circulates. Further, because the brake fluid is not confined in the route in which the pressure is increased using the pump 7, the pressure in the route can be prevented from excessively increasing.

The ECU 100 acquires the ratio R while changing the discharge flow amount of the pump 7 three times, and determines an abnormality in the master cylinder pressure sensor 91 or the discharge pressure sensor 92 based on each of the ratios R1, R2, and R3. Because each of the ratios R1, R2, and R3 always falls within the constant and normal range when both the pressure sensors 91 and 92 are normal, the ECU 100 can determine that one of the two pressure sensors 91 and 92 is abnormal when any of the three ratios R1, R2, and R3 falls outside the normal range or when the ratio R2 or R3 changes from the ratio R1.

When any of the three ratios R1, R2, and R3 falls outside the generally constant and normal range, the ECU 100 determines that an abnormality has occurred in the master cylinder pressure sensor 91 or the discharge pressure sensor 92. This can contribute to improving the detectability for an abnormality when the gain abnormality has occurred in one of the two pressure sensors 91 and 92.

When the individual ratios R1, R2, and R3 are different from one another, the ECU 100 determines that an abnormality has occurred in the master cylinder pressure sensor 91 or the discharge pressure sensor 92. This can contribute to improving the detectability for an abnormality when the offset abnormality or the sticking abnormality has occurred in one of the two pressure sensors 91 and 92.

When determining that an abnormality has occurred in the master cylinder pressure sensor 91 or the discharge pressure sensor 92, the ECU 100 warns the driver. As a result, the driver can be notified that an abnormality has occurred in one of the two pressure sensors 91 and 92 and can also be prompted to take the vehicle to a car dealer or a service shop.

The hydraulic pressure in the portion of the first fluid passages 11 that connects the shut-off valve 21P and the wheel cylinders 8 to each other (the first fluid passage 11B) can be detected only by the discharge pressure sensor 92. Therefore, because the present configuration includes no pressure sensor in the same route as the discharge pressure sensor 92 during the normal braking, the abnormality diagnosis processing according to the first embodiment can be preferably applied thereto and can improve the detectability for an abnormality in the discharge pressure sensor 92.

Second Embodiment

A second embodiment has a basic configuration similar to the first embodiment, and therefore will be described focusing only on differences therefrom.

Figure 8:
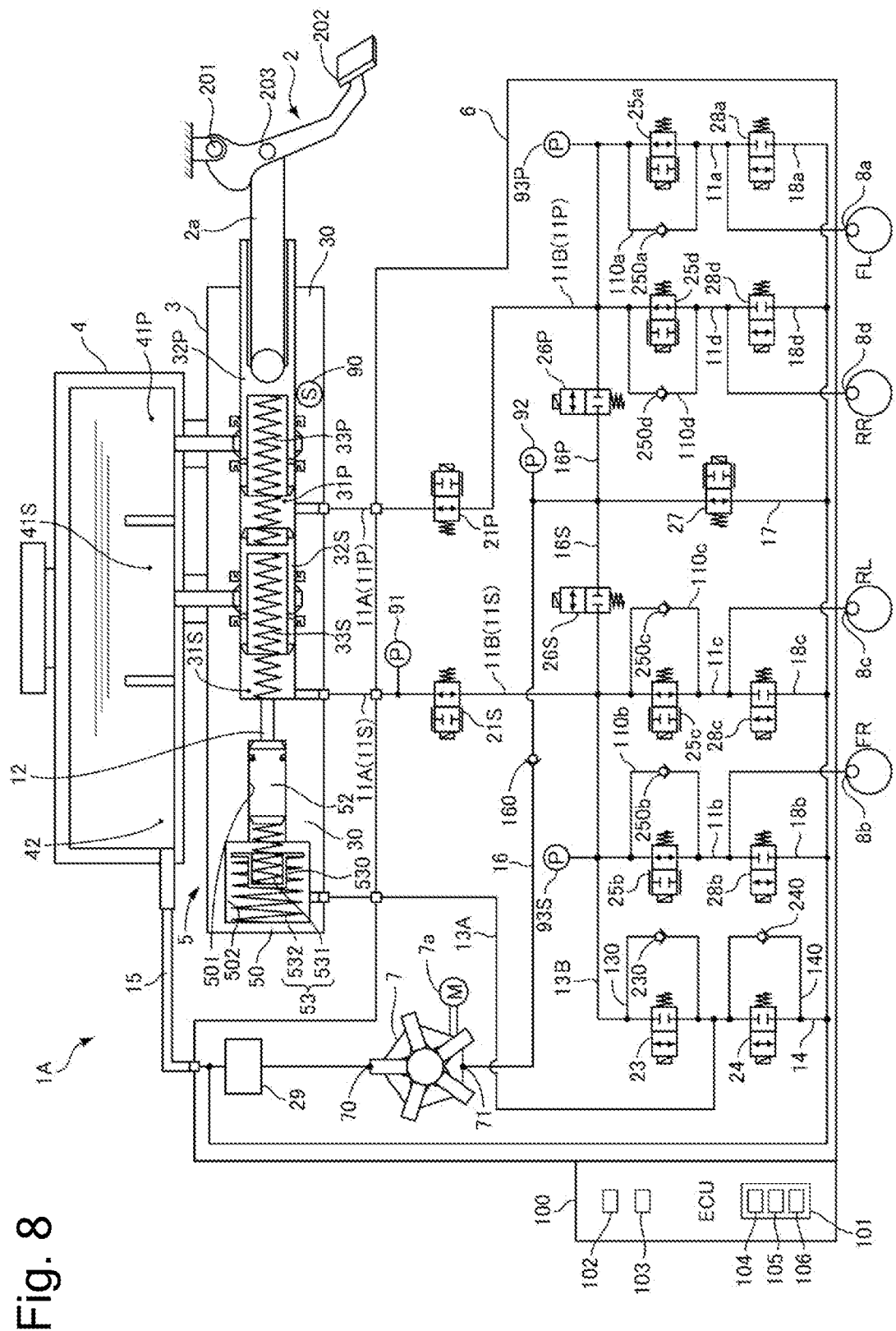
FIG. 8 illustrates the configuration of a brake control apparatus 1A according to a second embodiment.
Figure 9:
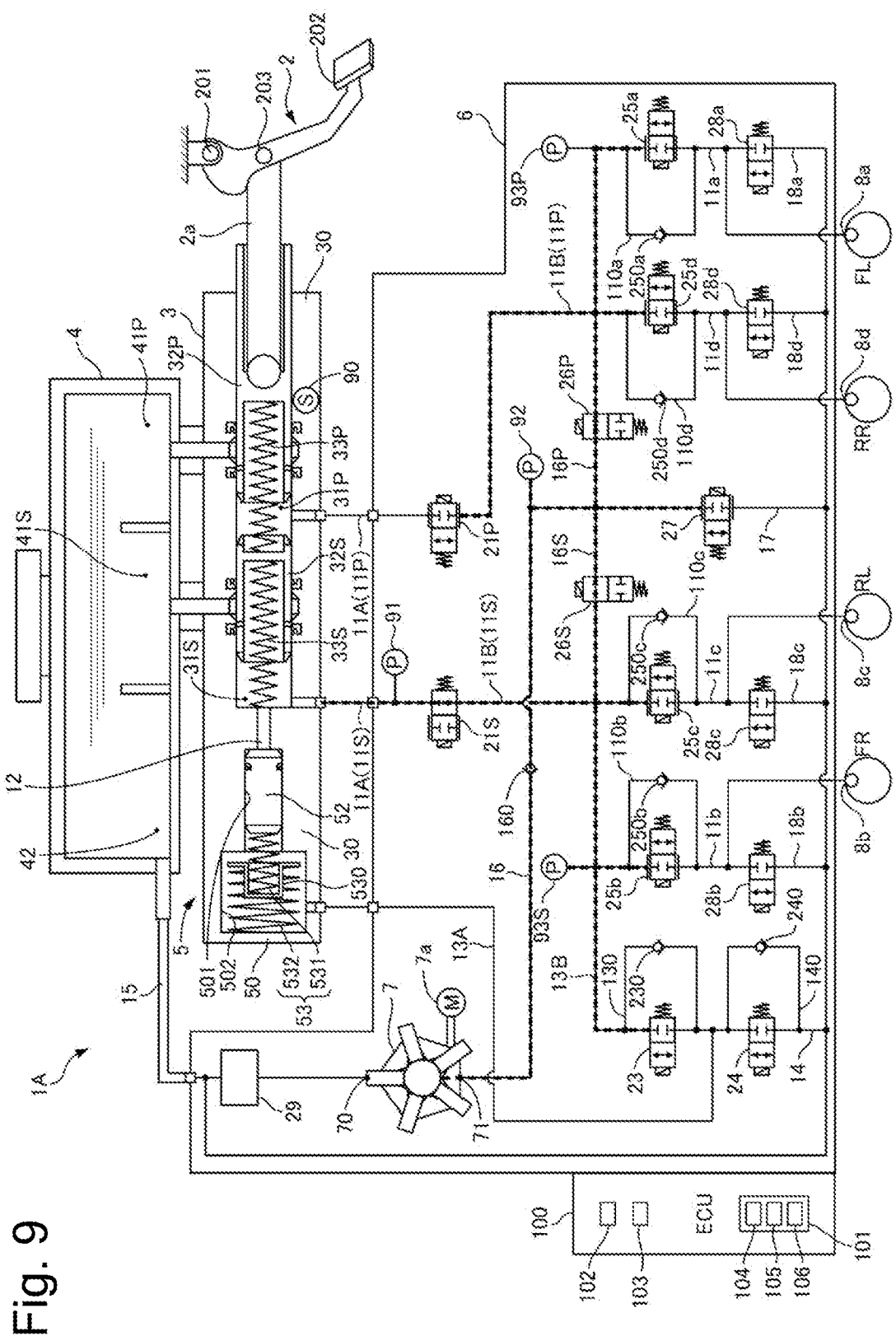
FIG. 9 illustrates the state of each actuator in abnormality diagnosis processing according to the second embodiment.

FIG. 8 illustrates the configuration of a brake control apparatus 1A according to the second embodiment.

The brake control apparatus 1A according to the second embodiment includes only a hydraulic brake. The hydraulic pressure control unit 6 can provide the braking torque to each of the front wheels FL and FR and the rear wheels RL and RR. The first fluid passage 11P branches into the first fluid passages 11a and 11d, and the first fluid passage 11S branches into first fluid passages 11b and 11c. The cylinder 30 of the master cylinder 3 and the cylinder 50 of the stroke simulator 5 are formed in the same block. The master cylinder pressure sensor 91 is provided in the first fluid passage 11A (11S) of the S system. Wheel cylinder pressure sensors (a P-system pressure sensor and an S-system pressure sensor) 93 are provided between the shut-off valves 21 and the SOL/V INs 25 in the first fluid passages 11. The wheel cylinder pressure sensors 93 detect the hydraulic pressures at these portions (the wheel cylinder hydraulic pressures). The P-system pressure sensor and the S-system pressure sensor correspond to a third pressure sensor.

Abnormality diagnosis processing according to the second embodiment is similar to the abnormality diagnosis processing according to the first embodiment illustrated in FIG. 2. In the following description, the abnormality diagnosis processing according to the second embodiment will be described, focusing on steps including different processing from the first embodiment.

In step S4, the fail-safe portion 103 requests the wheel cylinder hydraulic pressure control portion 106 to operate the valves and increase the pressure using the pump. More specifically, the fail-safe portion 103 outputs a request to actuate the shut-off valve 21P of the P system in the valve-closing direction, actuate the communication valves 26 in the valve-opening directions, actuate the SOL/V INs 25 in the valve-closing directions, actuate the pressure adjustment valve 27 in the valve-closing direction, and drive the motor 7a with a predetermined number of rotations from the state in which all of the actuators are deactuated (the state in FIG. 8) in the hydraulic pressure control unit 6.

In step S6, the fail-safe portion 103 calculates Rmc=Pmc/Ppump, Rp=Pp/Ppump, and Rs=Ps/Ppump, which are ratios of the detection value Pmc of the master cylinder pressure sensor 91, a detection value Pp of the P-system pressure sensor 93P, and a detection value Ps of the S-system pressure sensor 93S to the detection value Ppump of the discharge pressure sensor 92 (the comparison value).

In step S7, the fail-safe portion 103 determines whether any of Rmc, Rp, and Rs deviates from 100%.

In step S10, the fail-safe portion 103 determines whether the ratios Rmcn+1, Rpn+1, and Rsn+1 after the pressure increase using the pump deviate from the ratios Rmcn, Rpn, and Rsn after the pressure increase using the pump, respectively.

The brake control apparatus 1A according to the second embodiment includes the P-system sensor 93P and the S-system sensor 93S that detect the pressures in the portions of the first fluid passages 11 that connect the shut-off valve 21P and the wheel cylinders 8 to each other (the first fluid passages 11B). Then, the ECU 100 determines an abnormality in the master cylinder pressure sensor 91 or the P-system sensor 93P (or the S-system sensor 93S) based on the detection value Pmc of the master cylinder pressure sensor 91 and the detection value Pp of the P-system sensor 93P (or the detection value Ps of the S-system sensor 93S) after actuating the shut-off valve 21S in the valve-opening direction and actuating the pump 7. Because the individual pressure sensors 92, 93P, and 93S are placed in the same route during the normal braking, an abnormality can be detected by comparing the respective detection values Pmc, Pp, and Ps, but the detectability for an abnormality can be improved by performing the abnormality diagnosis processing according to the second embodiment.

OTHER EMBODIMENTS

Having described the embodiments for implementing the present invention, the specific configuration of the present invention is not limited to the configurations of the embodiments, and the present invention also includes even a design modification and the like thereof made within a range that does not depart from the spirit of the present invention, if any.

For example, under an extremely low-temperature environment, the brake fluid becomes more viscous and has higher flow passage resistance, and therefore the detectability for an abnormality can be further improved by correcting the detection value based on a temperature sensor mounted on the pressure sensor.

The number of times that the amount of the pressure increase using the pump is switched in the abnormality diagnosis processing may be any number of times as long as this amount is switched once or more.

When it is diagnosed that an abnormality has occurred in the pressure sensor, a warning sound may be emitted in addition to or instead of the lightening of the warning lamp.

In the following description, technical ideas recognizable from the above-described embodiments will be described.

A brake control apparatus, in one configuration thereof, includes a connection fluid passage connecting a master cylinder and a braking force application portion to each other. The braking force application portion is configured to apply a braking force to a wheel according to a brake hydraulic pressure. The brake control apparatus further includes a shut-off valve portion provided in the connection fluid passage, a first pressure sensor configured to detect a hydraulic pressure in a portion of the connection fluid passage that connects the shut-off valve portion and the master cylinder to each other, a hydraulic pressure source configured to supply brake fluid to a portion of the connection fluid passage that connects the shut-off valve portion and the braking force application portion to each other, a second pressure sensor configured to detect a hydraulic pressure in the portion of the connection fluid passage that connects the shut-off valve portion and the braking force application portion to each other, and a control unit configured to determine an abnormality in the first pressure sensor or the second pressure sensor based on a detection value of the first pressure sensor and a detection value of the second pressure sensor after actuating the shut-off valve portion in a valve-opening direction and actuating the hydraulic pressure source.

According to a further preferable configuration, in the above-described configuration, the control unit acquires a comparison value between the detection value of the first pressure sensor and the detection value of the second pressure sensor a plurality of times while changing a brake fluid supply amount of the hydraulic pressure source, and determines the abnormality in the first pressure sensor or the second pressure sensor based on the plurality of comparison values.

According to another preferable configuration, in any of the above-described configurations, the control unit determines that the abnormality has occurred in the first pressure sensor or the second pressure sensor in a case where the plurality of comparison values falls outside a generally constant and predetermined range.

According to further another preferable configuration, in any of the above-described configurations, the control unit determines that the abnormality has occurred in the first pressure sensor or the second pressure sensor in a case where the plurality of comparison values is different from each other.

According to further another preferable configuration, in any of the above-described configurations, the control unit warns a driver in a case where the abnormality is determined to have occurred in the first pressure sensor or the second pressure sensor.

According to further another preferable configuration, in any of the above-described configurations, the hydraulic pressure in the portion of the connection fluid passage that connects the shut-off valve portion and the braking force application portion can be detected only by the second pressure sensor.

According to further another preferable configuration, in any of the above-described configurations, the brake control apparatus further includes a third pressure sensor configured to detect the hydraulic pressure in the portion of the connection fluid passage that connects the shut-off valve portion and the braking force application portion to each other. The control unit determines an abnormality in the first pressure sensor or the third pressure sensor based on the detection value of the first pressure sensor and a detection value of the third pressure sensor after actuating the shut-off valve portion in the valve-opening direction and actuating the hydraulic pressure source.

Further, from another aspect, a method for detecting an abnormality in a brake control apparatus, in one configuration thereof, includes causing a control unit of the brake control apparatus to actuate a shut-off valve portion in a valve-opening direction. The shut-off valve portion is provided in a connection fluid passage connecting a master cylinder and a braking force application portion to each other. The braking force application portion is configured to apply a braking force to a wheel according to a brake hydraulic pressure. The method further includes causing the control unit of the brake control apparatus to actuate a hydraulic pressure source configured to supply brake fluid to a portion of the connection fluid passage that connects the shut-off valve portion and the braking force application portion to each other, causing the control unit of the brake control apparatus to input a detection value of a first pressure sensor configured to detect a hydraulic pressure in a portion of the connection fluid passage that connects the shut-off valve portion and the master cylinder to each other, causing the control unit of the brake control apparatus to input a detection value detected by a second pressure sensor configured to detect a hydraulic pressure in the portion of the connection fluid passage that connects the shut-off valve portion and the braking force application portion to each other, and causing the control unit of the brake control apparatus to determine an abnormality in the first pressure sensor or the second pressure sensor based on the detection value of the first pressure sensor and the detection value of the second pressure sensor.

Preferably, in the above-described configuration, the control unit acquires a comparison value between the detection value of the first pressure sensor and the detection value of the second pressure sensor a plurality of times while changing a brake fluid supply amount of the hydraulic pressure source, and determines the abnormality in the first pressure sensor or the second pressure sensor based on the plurality of comparison values.

According to another preferable configuration, in any of the above-described configurations, the control unit warns a driver in a case where the abnormality is determined to have occurred in the first pressure sensor or the second pressure sensor.

The present invention is not limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-093626 filed on May 15, 2018. The entire disclosure of Japanese Patent Application No. 2018-093626 filed on May 15, 2018 including the specification, the claims, the drawings, and the abstract is incorporated herein by reference in its entirety.

REFERENCE SIGN LIST 1, 1A brake control apparatus
3 master cylinder
7 pump (hydraulic pressure source)
8 wheel cylinder (braking force application portion)
11 first fluid passage
21 shut-off valve (shut-off valve portion)
91 master cylinder pressure sensor (first pressure sensor)
92 discharge pressure sensor (second pressure sensor)
93P P-system pressure sensor (third pressure sensor)

93S S-system pressure sensor (third pressure sensor)
100 ECU (control unit)
FL to RL wheel

The invention claimed is:

1. A brake control apparatus comprising:
a connection fluid passage that connect a master cylinder and a braking force application portion to each other, the braking force application portion being configured to apply a braking force to a wheel according to a brake hydraulic pressure;
a shut-off valve portion provided in the connection fluid passage;
a first pressure sensor configured to detect a hydraulic pressure in a portion of the connection fluid passage that connects the shut-off valve portion and the master cylinder to each other;
a hydraulic pressure source configured to supply brake fluid to a portion of the connection fluid passage that connects the shut-off valve portion and the braking force application portion to each other;
a second pressure sensor configured to detect a hydraulic pressure in the portion of the connection fluid passage that connects the shut-off valve portion and the braking force application portion to each other; and
a control unit configured to determine an abnormality in the first pressure sensor or the second pressure sensor based on a detection value of the first pressure sensor and a detection value of the second pressure sensor after actuating the shut-off valve portion in a valve-opening direction and actuating the hydraulic pressure source.

2. The brake control apparatus according to claim 1, wherein the control unit acquires a comparison value between the detection value of the first pressure sensor and the detection value of the second pressure sensor a plurality of times while changing a brake fluid supply amount of the hydraulic pressure source, and determines the abnormality in the first pressure sensor or the second pressure sensor based on the plurality of comparison values.

3. The brake control apparatus according to claim 2, wherein the control unit determines that the abnormality has occurred in the first pressure sensor or the second pressure sensor in a case where the plurality of comparison values falls outside a generally constant and predetermined range.

4. The brake control apparatus according to claim 2, wherein the control unit determines that the abnormality has occurred in the first pressure sensor or the second pressure sensor in a case where the plurality of comparison values is different from each other.

5. The brake control apparatus according to claim 2, wherein the control unit warns a driver in a case where the abnormality is determined to have occurred in the first pressure sensor or the second pressure sensor.

6. The brake control apparatus according to claim 1, wherein the control unit warns a driver in a case where the abnormality is determined to have occurred in the first pressure sensor or the second pressure sensor.

7. The brake control apparatus according to claim 1, wherein the hydraulic pressure in the portion of the connection fluid passage that connects the shut-off valve portion and the braking force application portion can be detected only by the second pressure sensor.

8. The brake control apparatus according to claim 1, further comprising a third pressure sensor configured to detect the hydraulic pressure in the portion of the connection fluid passage that connects the shut-off valve portion and the braking force application portion to each other,
wherein the control unit determines an abnormality in the first pressure sensor or the third pressure sensor based on the detection value of the first pressure sensor and a detection value of the third pressure sensor after actuating the shut-off valve portion in the valve-opening direction and actuating the hydraulic pressure source.

9. A method for detecting an abnormality in a brake control apparatus, the method comprising:
causing a control unit of the brake control apparatus to actuate a shut-off valve portion in a valve-opening direction, the shut-off valve portion being provided in a connection fluid passage connecting a master cylinder and a braking force application portion to each other, the braking force application portion being configured to apply a braking force to a wheel according to a brake hydraulic pressure;
causing the control unit of the brake control apparatus to actuate a hydraulic pressure source, the hydraulic pressure source being configured to supply brake fluid to a portion of the connection fluid passage that connects the shut-off valve portion and the braking force application portion to each other;
causing the control unit of the brake control apparatus to input a detection value of a first pressure sensor, the first pressure sensor being configured to detect a hydraulic pressure in a portion of the connection fluid passage that connects the shut-off valve portion and the master cylinder to each other;
causing the control unit of the brake control apparatus to input a detection value detected by a second pressure sensor, the second pressure sensor being configured to detect a hydraulic pressure in the portion of the connection fluid passage that connects the shut-off valve portion and the braking force application portion to each other; and
causing the control unit of the brake control apparatus to determine an abnormality in the first pressure sensor or the second pressure sensor based on the detection value of the first pressure sensor and the detection value of the second pressure sensor.

10. The method for controlling the abnormality in the brake control apparatus according to claim 9, wherein the control unit acquires a comparison value between the detection value of the first pressure sensor and the detection value of the second pressure sensor a plurality of times while changing a brake fluid supply amount of the hydraulic pressure source, and determines the abnormality in the first pressure sensor or the second pressure sensor based on the plurality of comparison values.

11. The method for controlling the abnormality in the brake control apparatus according to claim 9, wherein the control unit warns a driver in a case where the abnormality is determined to have occurred in the first pressure sensor or the second pressure sensor.

* * * * *